US012682104B2

(12) United States Patent
Byun et al.

(10) Patent No.: US 12,682,104 B2
(45) Date of Patent: Jul. 14, 2026

(54) EFFICIENT ALLOW LISTING OF SQL INSIDE A DATABASE

(71) Applicant: Oracle International Corporation, Redwood Shores, CA (US)

(72) Inventors: Ji-Won Byun, Redwood City, CA (US); Ruyue Tan, Belmont, CA (US); Quan Yang, Newark, CA (US); Chi Ching Chui, San Ramon, CA (US)

(73) Assignee: Oracle International Corporation

( * ) Notice: Subject to any disclaimer, the term of this patent is extended or adjusted under 35 U.S.C. 154(b) by 163 days.

(21) Appl. No.: 18/592,098

(22) Filed: Feb. 29, 2024

(65) Prior Publication Data

US 2025/0278507 A1     Sep. 4, 2025

(51) Int. Cl.
*G06F 21/00*     (2013.01)
*G06F 21/62*     (2013.01)

(52) U.S. Cl.
CPC .. *G06F 21/6227* (2013.01); *G06F 2221/2101* (2013.01); *G06F 2221/2113* (2013.01)

(58) Field of Classification Search
None
See application file for complete search history.

(56) References Cited

U.S. PATENT DOCUMENTS

| | | | | | |
|---|---|---|---|---|---|
| 6,073,129 | A | * | 6/2000 | Levine | G06F 16/235 |
| 6,446,062 | B1 | * | 9/2002 | Levine | G06F 16/252 |
| | | | | | 707/758 |
| 6,708,185 | B2 | * | 3/2004 | Harris | G06F 16/217 |
| 7,487,149 | B2 | | 2/2009 | Wong | |
| 7,860,842 | B2 | | 12/2010 | Bronnikov et al. | |
| 8,275,763 | B2 | * | 9/2012 | Weissman | G06F 21/6218 |
| | | | | | 707/718 |
| 8,918,866 | B2 | * | 12/2014 | Luo | H04L 63/1441 |
| | | | | | 726/22 |
| 9,043,309 | B2 | * | 5/2015 | Ahmed | G06F 21/30 |
| | | | | | 707/748 |
| 2009/0055166 | A1 | | 2/2009 | Moyle | |
| 2014/0359697 | A1 | * | 12/2014 | Ji | H04L 63/0263 |
| | | | | | 726/1 |

OTHER PUBLICATIONS

"How to prevent SQL injections when WAF's not enough," Cossack Labs, URL: https://www.cossacklabs.com/blog/how-to-prevent-sql-injections/, dated Feb. 13, 2019.
Robinson, et al., "SQL Injection and Cross Site Scripting Prevention Using OWASP Web Application Firewall," International Journal on Informatics Visualization, vol. 2, No. 4, dated 2018.

(Continued)

*Primary Examiner* — Maung T Lwin
(74) *Attorney, Agent, or Firm* — Vista IP Law Group, LLP

(57)     ABSTRACT

Disclosed is an improved approach to implement an in-database allow-list to address SQL injection threats. The allow-list includes a list of legitimate SQL that is permitted to run within the database, which can be used to block the execution of any SQL that does not appear on the list. In this way, any malicious SQL from a SQL injection would be blocked since such malicious SQL would not be permitted to be included on an allow-list.

28 Claims, 7 Drawing Sheets

SQL Log 302

| SQL Signature | SQL Text | Accessed Objects | Command Type |
|---|---|---|---|

Event Log 304

| Session ID | SQL Signature | Current User ID | Top Level (Y/N) | Session User ID |
|---|---|---|---|---|

Session Log 306

| Session ID | Session User ID | IP Address | Client Program | OS username | Timestamps |
|---|---|---|---|---|---|

(56) References Cited

OTHER PUBLICATIONS

Cetin, C., "Authentication and SQL-Injection Prevention Techniques in Web Applications," Graduate Thesis, University of South Florida, dated Jun. 2019.

Bandhakavi, S., et al., "Candid: Preventing SQL Injection Attacks using Dynamic Candidate Evaluations," CCS'07, Oct. 29-Nov. 2, 2007, Alexandria, Virginia, USA, Copyright 2007.

"Doing SQL from PL/SQL: Best and Worst Practices," Oracle White Paper, dated Sep. 2008.

Yamini, B., et al., "Securing Firewall Against Denial of Firewall and SQL Injection Attacks," IJSART—vol. 4 Issue 3—Mar. 2018.

Agarwal, R., et al., "An Efficient Technique for finding SQL Injection using Reverse Proxy Server," International Research Journal of Engineering and Technology (IRJET), vol. 06 Issue: 09, dated Sep. 2019.

Sharma, D., et al., "SQL Injections and Prevention Actions," JETIR Oct. 2018, vol. 5, Issue 10.

* cited by examiner

EFFICIENT ALLOW LISTING OF SQL INSIDE A DATABASE

BACKGROUND

Database applications interact with a database server by sending to the database server commands that conform to a language supported by the database server. The Structured Query Language (SQL) is a popular language supported by many database servers. SQL may be used to specify a wide variety of operations to be performed on data within a database, such as operations to manipulate the data within a database table, or operations to configure the existence or structure of objects/tables within a database.

Certain operations performed by SQL commands may compromise the integrity of the database against which the operations are performed. For example, a SQL command that is incorrectly issued may negatively change the structure of a table, make improper modifications to data, or mistakenly allow access to the data within a table by an unauthorized user.

Under certain conditions, a database application may send to a database server a SQL command that requests an operation that the application was not designed to request. This scenario may occur, for example, if some or all of the text of the SQL command sent by the application is the result of a "SQL injection". A "SQL injection" is the input and eventual execution of a syntactically meaningful fragment of SQL through an ordinary user data entry mechanism. Commonly, the term "SQL injection" is reserved for such inputs which are not anticipated by the application developers to be SQL fragments.

A "SQL injection threat" is a SQL injection that acquires access to the database and its facilities, which access was not intended to be granted. Such an injection is a "threat" because the unintended access can be used to damage or subvert the database. A SQL injection may be benign, understood, and intended by the application designer or "malignant" in the sense that the application designer did not intend for the injection to exist.

In fact, SQL injection has become one of the most common methods for hackers to attack databases. A successful attack may allow attackers to inject malicious SQL commands that are potentially executed by a highly privileged user in database server. Due to the nature of the attack, it is normally quite difficult for database to detect and/or prevent SQL injection attacks, and the result of executing injected SQL commands could be devastating (e.g., unauthorized data exposure and manipulations, privilege escalations, etc.).

One common approach to prevent such attacks is to implement a remote firewall mechanism across a network to prevent the receipt of a SQL injection threat at the database system. However, one drawback of using this type of firewall to prevent such threats is that they typically require network reconfiguration for deployment. In addition, the firewall cannot monitor local (non-network) or out-of-band connections. Furthermore, the firewall approach cannot monitor SQL commands issued by a stored procedure.

Thus, there is a need for an improved approach to implement comprehensive monitoring and prevention of SQL injection threats.

SUMMARY

Embodiments of the invention provide an improved approach to implement an in-database allow-list to address SQL injection threats. The allow-list includes a list of legitimate SQL that is permitted to run within the database, which can be used to block the execution of any SQL that does not appear on the list. In this way, any malicious SQL from a SQL injection would be blocked since such malicious SQL would not be permitted to be included on an allow-list. Furthermore, since the allow-list of the present embodiments is implemented within the database itself, this means that even localized or out-of-band operations can be monitored and addressed for the allowed SQL.

Further details of aspects, objects, and advantages of the invention are described below in the detailed description, drawings, and claims. Both the foregoing general description and the following detailed description are exemplary and explanatory, and are not intended to be limiting as to the scope of the invention.

BRIEF DESCRIPTION OF THE FIGURES

The drawings illustrate the design and utility of some embodiments of the present invention. It should be noted that the figures are not drawn to scale and that elements of similar structures or functions are represented by like reference numerals throughout the figures. In order to better appreciate how to obtain the above-recited and other advantages and objects of various embodiments of the invention, a more detailed description of the present inventions briefly described above will be rendered by reference to specific embodiments thereof, which are illustrated in the accompanying drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION OF THE EMBODIMENTS OF THE INVENTION

Various embodiments are described hereinafter with reference to the figures. It should be noted that the figures are not necessarily drawn to scale. It should also be noted that the figures are only intended to facilitate the description of the embodiments, and are not intended as an exhaustive description of the invention or as a limitation on the scope of the invention. In addition, an illustrated embodiment need not have all the aspects or advantages shown. An aspect or an advantage described in conjunction with a particular embodiment is not necessarily limited to that embodiment and can be practiced in any other embodiments even if not so illustrated. Also, reference throughout this specification to "some embodiments" or "other embodiments" means that a particular feature, structure, material, or characteristic described in connection with the embodiments is included in at least one embodiment. Thus, the appearances of the phrase "in some embodiments" or "in other embodiments," in various places throughout this specification are not necessarily referring to the same embodiment or embodiments.

Embodiments of the invention provide an improved approach to implement an in-database allow-list to address the threat of wrongful SQL injection. The allow-list includes a list of legitimate SQL that is permitted to run within the database, which can be used to block the execution of any SQL that does not appear on the list. In this way, any malicious SQL from a SQL injection would be blocked since such malicious SQL would not be permitted to be included on an allow-list. Furthermore, since the allow-list of the present embodiments is implemented within the database itself, this means that operations that do not operate through a firewall (e.g., localized operations) can be monitored and addressed for the allowed SQL.

Figure 1:
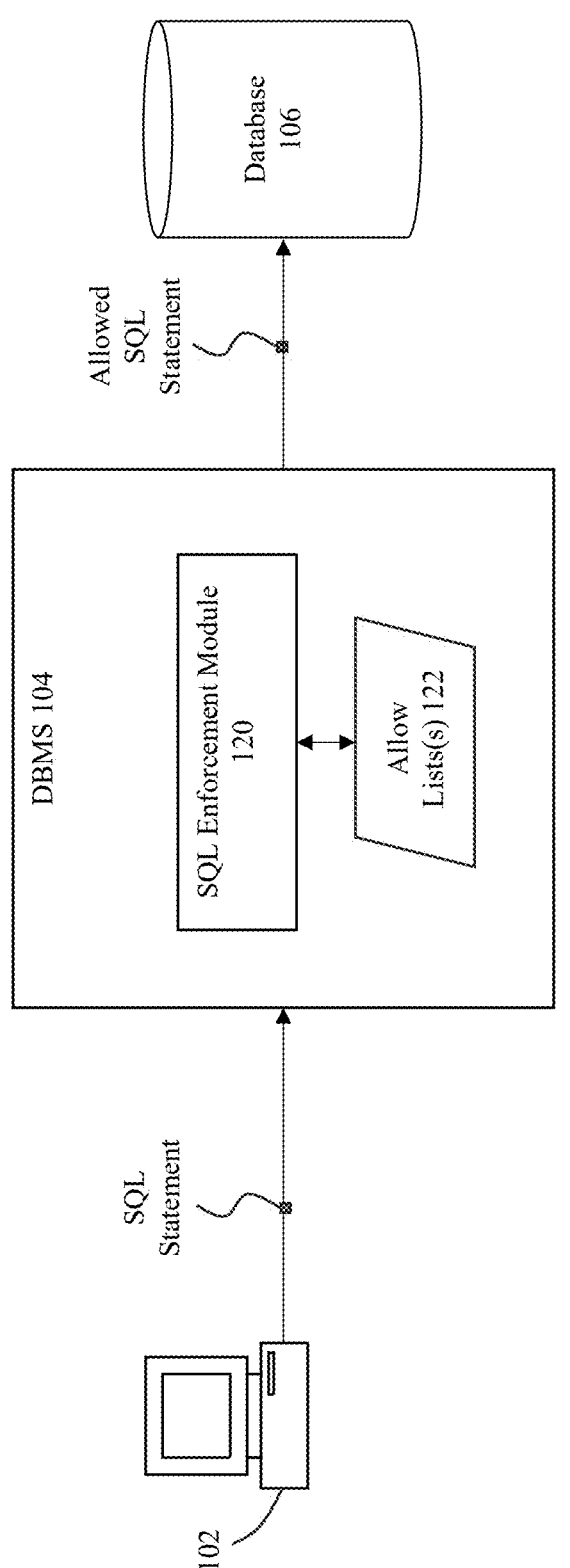
FIG. 1 shows an architecture of a system to implement some embodiments of the invention.
Figure 1:

FIG. 1 shows an architecture of a system to implement some embodiments of the invention. The system includes a database management server (DBMS) 104 that manages the storage of data in one or more databases 106. The mechanism(s) used to implement the database 106 for the DBMS 104 comprises any combination of hardware and software that allows for ready access to the data that is located at a computer readable storage device. For example, the database could be implemented as computer memory operatively managed by an operating system. The data in the database could also be implemented as database objects and/or files in a file system.

One or more users or applications use one or more access stations 102 to interact with the server 104. The access station 102 comprises any type of computing station that may be used to operate or interface with the server 104. Examples of such access or user stations include, for example, workstations, personal computers, mobile devices, remote computing terminals, servers, cloud-based services, or applications. The access/user station may comprise a display device, such as a display monitor, for displaying a user interface to users at the station. The access/user station may also comprise one or more input devices for the user to provide operational control over the activities of the architecture, such as a mouse or keyboard to manipulate a pointing object in a graphical user interface to generate user inputs.

According to some embodiments of the invention, a SQL enforcement module 120 is located within the DBMS 104 to implement monitoring and SQL injection prevention functionalities. The SQL enforcement module 120 may also be referred to herein as an embedded database firewall (EDBFW). The SQL enforcement module 120 provides allow-listing functionality (via the allow-list(s) 122) that is built inside the database—without the aforementioned shortcomings associated with a firewall that is external to the database.

The SQL enforcement module 120 can be configured to provide comprehensive and configurable monitoring. In particular, comprehensive database activity monitoring capability is provided, which is important for creating and maintaining the accurate allow-list 122 of SQLs.

When a SQL statement is received from the user station 102 for processing, the SQL enforcement module 120 will check the received SQL against the allow list 122 to determine whether the SQL should be permitted to run. In operation, a context-based approach can be used for enforcement of the allow-lists. What this means is that even if the SQL appears in the allow list, a set of configurable rules may be applied to determine the exact context in which that SQL is permitted to be executed against the data within the database 106.

From a component perspective, the SQL enforcement module 120 comprises several components that may be placed inside database kernel, including one or more of a SQL signature generator, a policy cache in a cursor, a policy enforcement component, a policy loader, and an event logger. The SQL signature generator generates a signature for each SQL statement and uses this signature to represent a set of SQL statements that have the same signature. The signature is generated based on normalized SQL statement and accessed objects. When runtime enforcement is enabled, this may slow down the database performance because of the overhead of security checks. As such, cursors (e.g., shared cursors) may be used to cache the firewall policy information for better database performance. For example, a firewall policy information can be loaded into cursors and accessed from the cursor to achieve better performance. The policy enforcement component determines if a statement should be allowed or blocked based on the SQL signatures, execution context, user profiles, etc. The policy loader loads the firewall policy (e.g., into dictionary tables) for logging and enforcement. The event logger generates a detailed log for every SQL execution whenever needed (e.g., specified in the policy) and stores it in the database.

From a user/admin perspective, the users/admins of the firewall will perform operations to register target databases, create firewall policies, and deploy firewall policies to registered target databases. Specifically, a target database is registered and protection/monitoring is enabled on the target. One or more policies that monitor SQL activities or sessions are created and deployed to the target database. At the target database, the deployed policy is loaded into dictionary tables, and enforcement is started for the specified policy on database activities, with logs generated for required events. The firewall service continuously retrieves the generated logs from the target database, where the logs will be available for further analysis. The policy can be modified based on log analysis and a new version of the policy can be deployed to the target database.

Figure 2:
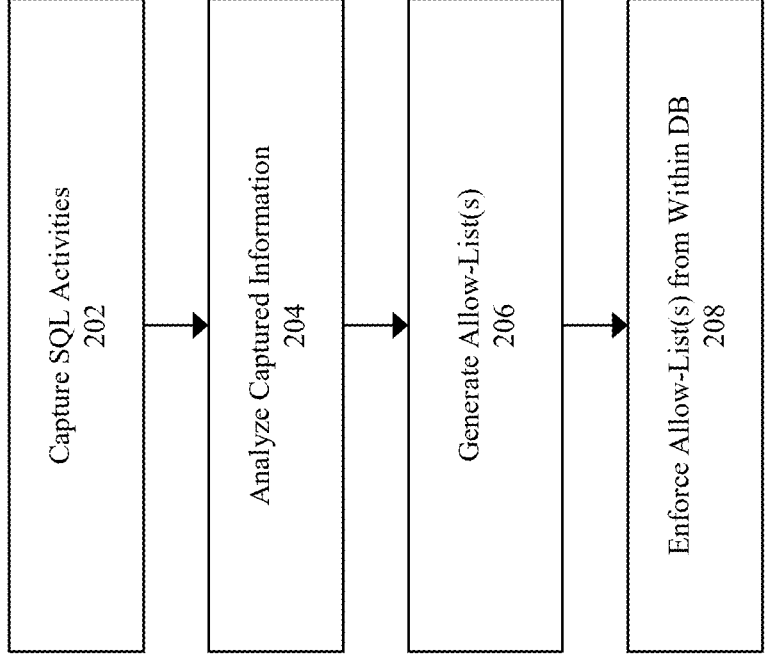
FIG. 2 shows a flowchart of an approach to implement some embodiments of the invention.

FIG. 2 shows a flowchart of an approach to implement some embodiments of the invention. This flow can be broken down into two phases, including a learning phase and an execution/protection phase.

In the learning phase, at step 202, every database activity (e.g., user logins and DML/DDL SQL executions) can be logged with contextual information. The scope of monitoring is configurable to avoid excessive logging and generate logs only for activity of interest. For example, the logging may be configured with respect for specific users, modules, or client IP addresses, etc. The logs are stored in database tables, and in some embodiments the logs can be offloaded to another storage (e.g., to cloud storage services) for further analysis.

At 204, analysis is then performed upon the collected data. This step performs verification and validation of the SQL that has previously been run within the database. For the allow lists, the analysis is performed to identify SQL that is correctly drafted and which can be safely and successfully be executed in the database. The identified SQL statements that can safely be run in the database are placed in the allow lists at step 206.

It is noted that the current embodiment (shown in FIG. 1) only depicts allow lists 122, where the allow lists identify SQL that is permitted to be executed within the database. The current embodiment is usable to monitor and implement prevent execution of malicious SQL injection with just the allow lists. However, while not expressly shown in the figure, an alternate embodiment may also include deny lists as well, where the deny lists identify SQL that is not permitted to be executed within the system. For the deny lists, the analysis is performed at 204 to identify SQL that are either malicious or otherwise cannot be successfully executed in the database.

As discussed above, a context-based approach can be used for enforcement of the allow-lists. Based on analysis of the collected logs, one or more policies can be created and deployed to a target database to implement context-based enforcement. The allow-list would thus include both a SQL statement along with its associated policy. A policy may include a list of collected SQLs with a specific condition for each SQL, in which one or more specified actions may be taken. For instance, one can specify SQL_1 to be blocked when the SQL is issued by specific users while SQL_2 is allowed only when the SQL is issued from a specific IP range. Together with conditional default rules (e.g., actions to be taken when an issued SQL does not match any SQL in the list), this allows the configured policies to enforce the allow-list in the specified circumstances.

It is noted that multiple types of allow-lists may be created and/or populated at step 206. As previously noted, a SQL-based allow-list would include a set of SQL statements that are permitted to be run in the system, possibly along with a set of conditions for running that SQL. Other types of allow-lists may also be implemented. For example, a context-based allow list may also be used to identify a context for which the user and/or session is permitted to operate with the database. The context-based allow-list may include an identification of specific users, user characteristics, sessions, session characteristics, along with any conditions (e.g., specific allowed users, time of day, connection IP address, application/workload type, etc.) that such users or sessions are permitted to access and operate the database.

A "policy" according to the current embodiment is implemented as a JSON representation of attribute sets, profiles, SQL signatures and rules that determine allowed and blocked activities and the logging behavior. The contents of the allow-lists include a set of policies that have been configured for a particular target database. When a policy is deployed in a target database, the policy is loaded into a CLOB object and passed to the target database using a PL/SQL procedure.

The SQL allow-list comprises is a collection of unique pairs in the form of <SQL signature, execution context>, where SQL signature is a hash of normalized SQL statement concatenated with accessed objects, and execution context includes the current user ID and 'Y' (top-level) or 'N' (non-top-level). An entry in the SQL allow-list indicates that a SQL command matching the SQL signature should be allowed for execution if the corresponding execution context (i.e., current username and top-level) also matches the current execution state. The Allowed_SQLs for a particular user are generated from the existing capture logs belonging to the user. Essentially, for each unique SQL event found in the event logs of the user, the SQL signature will be extracted along with the corresponding execution context and added as an entry into the Allowed_SQLs of the user.

The context allow-list for a particular user comprises three distinct groups, including client IP addresses, OS usernames, and OS program names, that should be allowed for the user to connect to the database. This list is generated from the existing session logs captured for the user. These can be modified for a particular user by removing/adding desired values using a designated administrative procedure. It is noted that additional types of contexts may also be used in conjunction with embodiments of the invention, and thus the inventive concept is not limited just to these specific examples provided above. For instance, additional contexts may be defined with respect to additional user, system, or any other appropriate characteristics. For example, based upon the specific role or title assigned to a user.

At 208, enforcement is implemented for the SQL that are sent to the database for execution. This step is taken to enforce the SQL and any associated conditions within the allow lists. By checking against the allow-list, the system would thus be able to determine whether to allow (or block) the execution of SQL that is submitted for execution. In addition, logging is performed to log the enforcement decision that is made.

Figure 3:
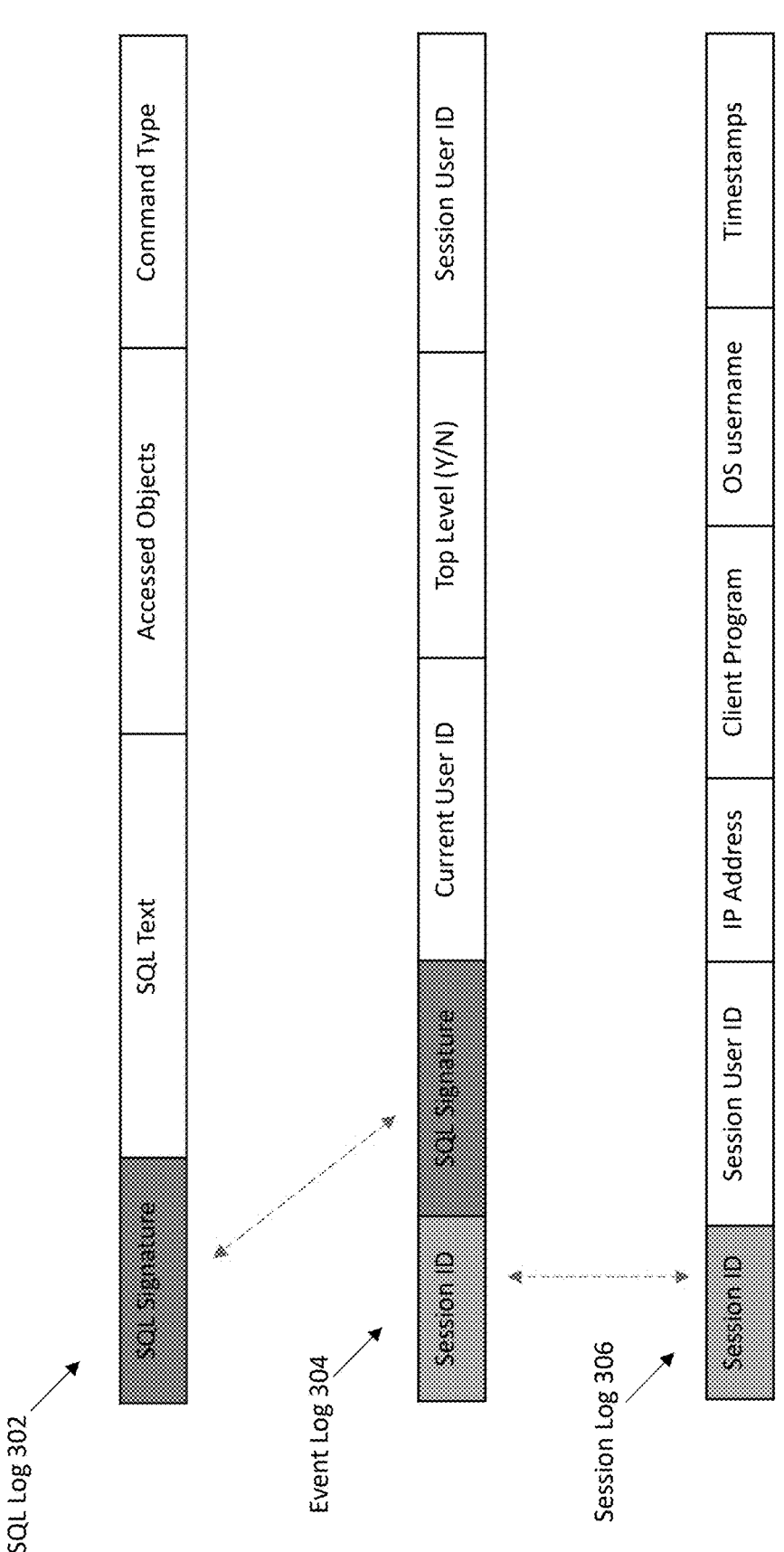
FIG. 3 provides illustrated examples of logging structures that may be employed to implement logs.

Efficient logging approaches to implement the capture of SQL activities may also be implemented. Each SQL activity monitored by EDBFW should provide a comprehensive set of information, including for example the SQL text, the complete list of accessed objects, session user, current user, client IP address, and/or the module. In order to achieve this goal efficiently, embodiments generate three types of monitoring logs, including a session log, a SQL log, and an event log. FIG. 3 provides illustrated examples of logging structures that may be employed to implement these logs.

An entry in the session log 306 is generated when a new database connection is made successfully. In the illustrative example of FIG. 3, this log contains information such as a session ID, timestamp, session user, client IP address, and other session context values. In some embodiments, the session log is structured as a relational database table having a separate column for each of fields. The table may include multiple rows, where each row corresponds to a distinct session for a database connection.

An entry in the SQL log 302 is produced to correspond to each distinct SQL that is tracked by the system. For example, the entry in this log may be produced whenever a SQL command is being executed for the "first" time by the database. Each entry may include information such as for example, a SQL signature, normalized SQL text, command type, and fully qualified names of objects accessed by the SQL command. In some embodiments, the SQL log is structured as a relational database table having a separate column for each of fields. The table may include multiple rows, where each row corresponds to a distinct SQL statement. It is noted that once a SQL log entry is generated for a particular SQL command, its signature may be cached in a shared cursor (and possibly an internal firewall in-memory cache) so that subsequent executions of the same SQL statement will not generate a new entry in the SQL log. This approach may significantly reduce the log storage requirements of the system.

An entry in the event log 304 is generated whenever a SQL command is executed. Erach entry in this log may include information such as for example a timestamp, session ID of the current session, SQL signature of the executed SQL command, current user, and/or an enforcement result. In some embodiments, this log is structured as a relational database table having a separate column for each of the desired fields, where the table may include multiple rows and each row corresponds to a distinct event involving a SQL command.

By maintaining the logs in this manner, this provides a very efficient approach to capture SQL activities in the system. This is because duplicative information does not need to be unnecessarily repeated over and over again, as would possibly occur if much of this information is captured in a single table. Instead, the information is separated into these distinct logs. During analysis of collected logs, each event log is combined (joined) with the corresponding session log and SQL log to provide the full picture of the particular SQL activity. This approach not only speeds up the process of generating log entries (by minimizing the amount of data to be written when creating the log entries), but also reduces the amount of storage needed to create and maintain the logs.

Figures 4A, 4B:
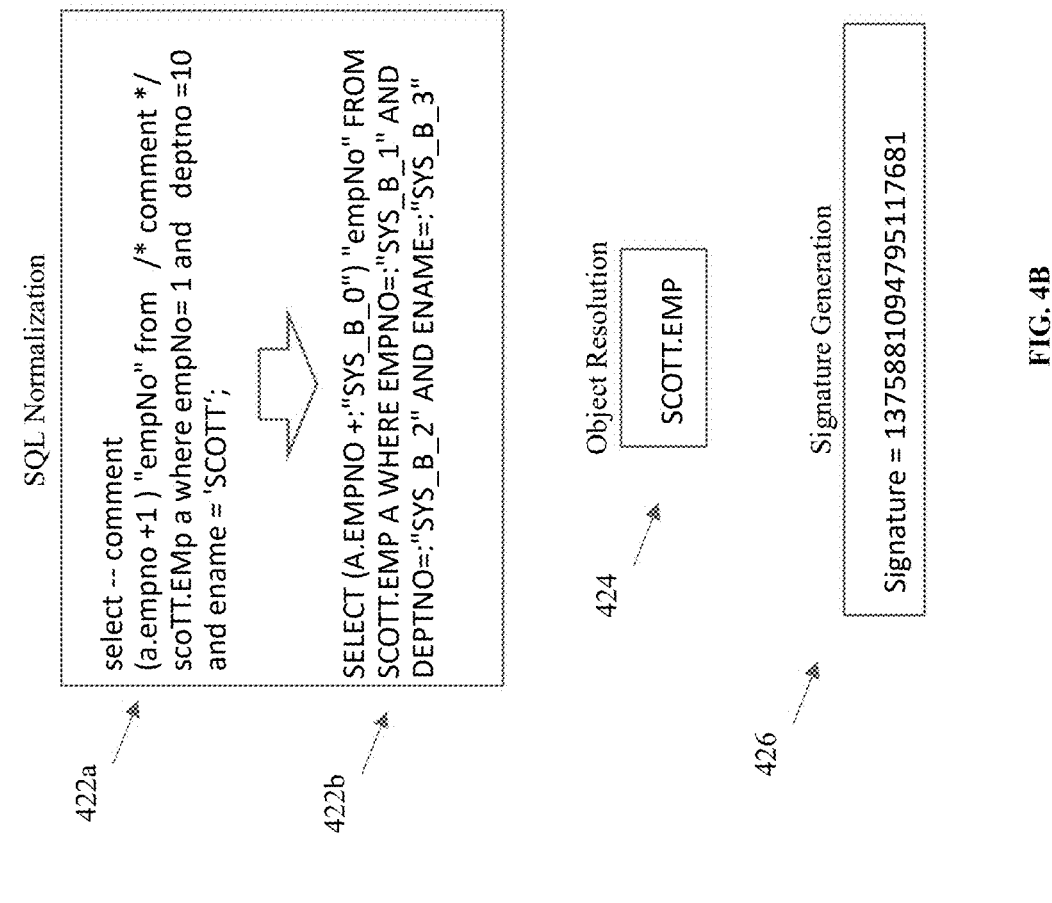
FIGS. 4A and 4B illustrate an approach to generate a SQL signature according to some embodiments of the invention.

FIGS. 4A and 4B illustrate an approach to generate a SQL signature according to some embodiments of the invention. The SQL signature is used to uniquely identify each distinct SQL statement with a corresponding value that will not be duplicated with the signature of another other SQL statement. Each SQL statement undergoes a series of steps for its signature generation.

At step 402, an item of SQL text is received for processing. The SQL text may be received, for example, based upon SQL captured during a training phase, in order to generate a SQL signature for placement in the allow-list. The SQL text may also be received during the protection phase, to check the signature of a received SQL command against the contents of an allow-list to determine whether to allow the SQL to execute.

At step 404, SQL normalization is applied to the SQL. This step can be performed to remove any content from the SQL that is not logically important for the SQL-injection-related functionality of the SQL. For example, in one embodiment, normalization is performed to remove redundant white spaces, comments, hints, uppercases, unquoted tokens, and replaces literals with a special symbol. In this way, it is expected that many application-generated SQLs will end up as the same SQL after the normalization.

FIG. 4B shows an example of SQL normalization. Here, SQL 422a has been received for processing. The normalized version 422b of the SQL has its comments removed (e.g., "/*comment*/"), excess spaces removed, and lower-case changed to upper-case. In addition, literals (e.g., "empNo" and "Scott") have been changed to a special symbol (e.g., "SYS_B_O" and "SYS_B_3").

At step 406, access objects are resolved by the system. This step retrieves the fully qualified names of objects accessed by the SQL statement after the final name resolution. This is to remove any ambiguity introduced by object references in the SQL statement or any existing synonyms. For instance, the object list from "select * from emp" issued by Scott should be different from the object list of "select * from emp" issued by Tom. In the current example, the object resolution would resolve the accessed object 424 to "SCOTT.EMP".

Next, at 408, a SQL signature is generated for the SQL text. The SQL signature is the representation of a group of SQL statements that share the same syntactical SQL structure and access the same objects, and it is used during policy specification and policy enforcement. In some embodiments, the SQL signature is generated by hashing the concatenation of the normalized SQL text and the accessed object list. Any suitable hashing algorithm may be used to generate the signature. For example, the SHA-256 or SHA-512 algorithms may be used in certain embodiments to generate the SQL signature (e.g., Signature=SHA256 of (normalized SQL+access objects), as illustrated at 426 of FIG. 4B).

Figure 5:
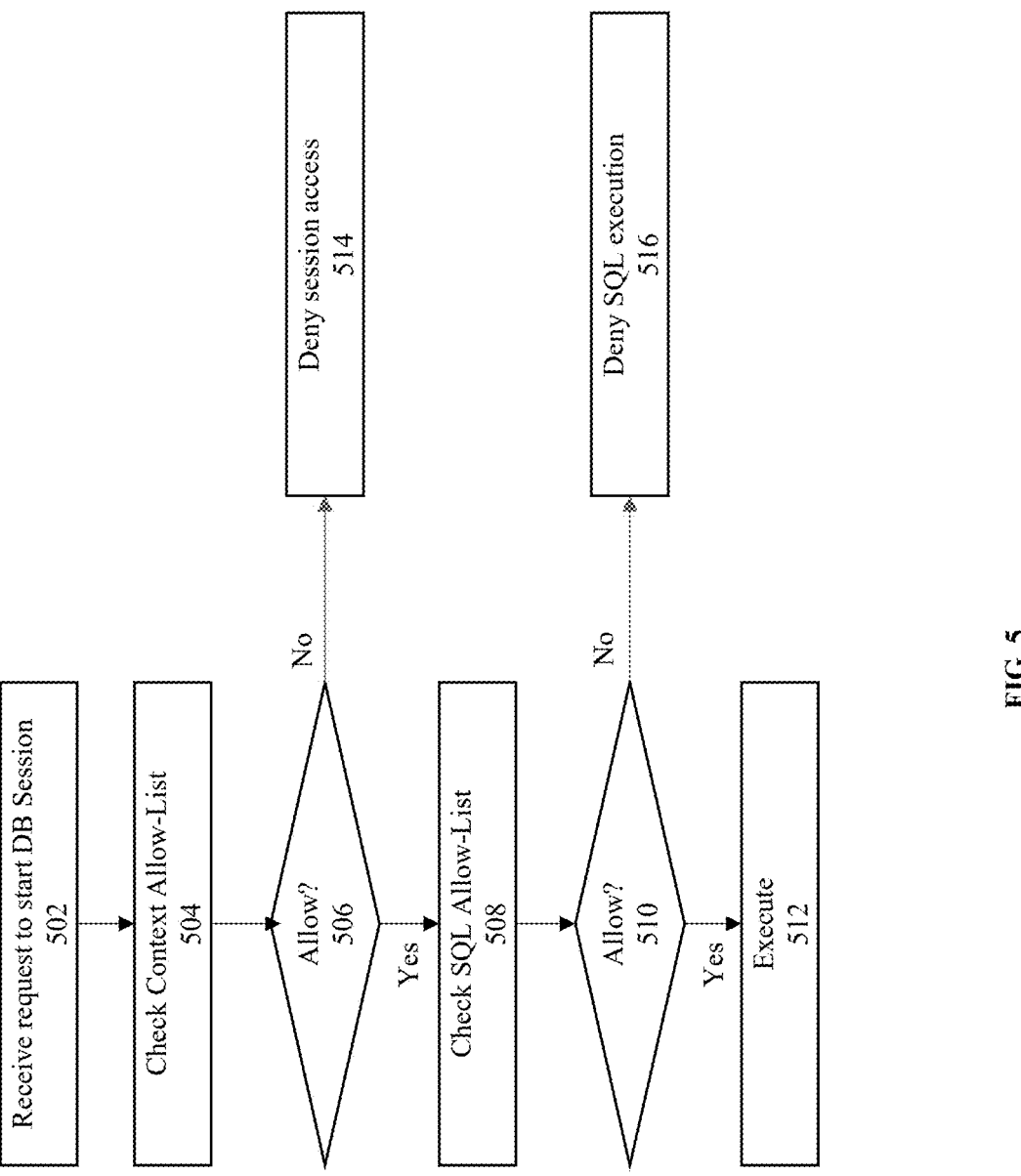
FIG. 5 shows a flowchart of the protection phase of the invention according to some embodiments.

FIG. 5 shows a flowchart of the protection phase of the invention according to some embodiments. When a SQL statement is received for execution, a decision is made whether execution should be allowed or blocked, and logged at which level. This means that the policy enforcement must occur for every execution of every cursor, including select cursor, DML cursor, and DDL cursors. Each SQL statement is evaluated through one or more sets of rules as specified in the allow-lists. In operation, after the allow-lists have been generated, the allow-lists can be enabled or disabled for the user/database. When the allow-list is enabled, the firewall will check the enabled allow-list for the user as follows: (a) Database connections: Does the current session context (e.g., client IP address, OS program name, and OS user-name) match any value in the Allowed_Contexts?; (b) SQL executions: Does the current SQL command and execution state (current user ID and whether it is a top-level or not) match any of SQL signature and execution context in the Allowed_SQLs? These actions are described in more detail below.

At 502, a request is received to start a database session. At 504, a context check is performed against a context allow-list to determine whether to allow the session to proceed. This check is based upon context rules that are configured within the context allow-list, which define session attributes that are checked to determine whether to permit the session to proceed. These checks are typically performed at session connection time, since the checked properties typically will not change afterwards.

The context rules may be implemented as an unordered group of <profile, action, logging-level, threat-severity>, where action is either 1—"ALLOW" or 2—"BLOCK", logging-level is either 1—"LOG" or 0—"NO LOG", and threat-severity is a positive integer from 1 to 5 indicating the severity of event, where 1 is the least important and 5 is the most severe. During the evaluation of the context rules, all the specified profiles are evaluated against the current context, the most restrictive action of matching profiles is taken. Context rules are used to specify an action to take purely based on the current context. For instance, the context rules can be used to allow database administrative users to execute any statement or block any statement if database connection is made from certain IP addresses.

If the rule conditions for the context check are not met, then access is denied at 514. On the other hand, if the rule conditions are met, then the process will go to step 508 to check the SQL allow-lists. At this stage, the SQL rule(s) within the SQL allow-lists are checked to determine whether to allow the SQL to be executed. In particular, this check is made against the SQL signatures within the allow-lists based upon the normalized SQL text and the accessed objects.

The SQL rules may be implemented as an unordered group of <SQL text, accessed objects, profile rule list>. Here SQL text is a normalized SQL text, accessed objects is a list of fully qualified names of objects accessed by the SQL command, profile rule list is an unordered collection of <profile, action, logging-level, threat-severity>, action is either 1—"ALLOW" or 2—"BLOCK", logging-level is either 1—"LOG" or 0—"NO LOG", and threat-severity is a positive integer from 1 to 5 indicating the severity of event. During the evaluation of the SQL rules, if the current SQL statement matches the normalized SQL text, all the associated profiles are evaluated against the current context and the most restrictive action of matching profiles is taken. SQL rules are mainly used to create an allow-list (or deny-list) of specified SQL statements.

If the signature of the SQL currently sought to be executed exactly matches a signature within the SQL allow-list (and other applications conditions for the rule are also met), then the SQL is permitted to be executed at 512. On the other hand, if the signature does not match an allowed SQL command-access objects combination, then execution will be denied at 516.

It is noted that the level of allow-list enforcement will depend on the level of SQL capture. In other words, if the SQL capture for the user was created for top-level SQL commands only, then the generated allow-list will be enforced for top-level SQL commands only. If the SQL capture was created for both top-level SQL commands and commands from PL/SQL units, then the generated allow-list will be enforced for both cases.

Any unsuccessful match in the checks above means that database connection or SQL command is not in the allow-list and will be considered as a violation, and a violation log entry can be generated. Each violation log includes a session ID, session user ID, SQL signature, current user ID, and top-level ('Y'/'N'), the cause of the violation (1 for session context mismatch and 2 for SQL mismatch), the action taken by SQL Firewall (0 for allowed and 1 for blocked), and timestamp.

Other types of conditional rules/lists may also be used in conjunction with embodiments of the invention. For example, an alternative embodiment may use both an allow-list and a deny-list: It is noted that some approaches may enforce either allow-list or deny-list, but not both in the same policy configuration. This is due to the semantics of allow-list (block everything except the ones in the list) and deny-list (allow everything except the ones in the list). Specifically, to enforce allow-list, the default behavior (e.g., the case where none in the list matches the current SQL) should be blocked while the default behavior should be allowed for the deny-list case. However, by applying different default behaviors depending on the specified condition, this alternate embodiment can handle both the allow-list and the deny-list to be specified and enforced at the same time. For instance, one can create and enforce an allow-list for a particular application and a deny-list for a particular administrator.

Yet another type of conditional rule is a command rule. This type of rule is based upon a given SQL command type and/or for a given access object or set of objects. An alternative embodiment may use this type of conditional rule in addition to the SQL allow-list. The command rules may be implemented as an unordered collection of <command, object specification (optional depending on command type), profile rule list>. Here command is SQL command type, object specification is object owner and object name, and profile rule list is an unordered collection of <profile, action, logging-level, threat-severity>, where action is either 1—"ALLOW" or 2—"BLOCK", logging-level is either 1—"LOG" or 0—"NO LOG", and threat-severity is a positive integer from 1 to 5 indicating the severity of event.

Another possible rule type is the "default rule". Default rules are used to specify an action take purely based on the current context when none of the previous rules matches the current SQL execution. The default rules may be configured as an unordered group of <profile, action, logging-level, threat-severity>, where action is either 1—"ALLOW" or 2—"BLOCK", logging-level is either 1—"LOG" or 0—"NO LOG", and threat-severity is a positive integer from 1 to 5 indicating the severity of event.

These differing rules may be applied in any order or sequence are desired for a specific implementation of the invention. For example, in one embodiment, these rule types are applied in an ordered sequence, e.g., where the allow rules are applied in a priority order higher than the deny rules, so that SQL that is permitted pursuant to an allow rule may still run even if it is also not permitted under a deny rule. In this situation, the rules are applied in a serial manner such that the SQL may be processed by a first rule type, and if not handled to resolution, then applied with the next rule type, and so on until a resolution is achieved. In an alternate embodiment, the rule types are applied without a priority order. In this situation, a conflict may occur, e.g., where the same SQL may be allowable under an allow rule but not allowable under a deny rule. In this situation, additional rules may be needed for resolution, e.g., to impose a tie-break or to consider additional parameters or factors.

The approach described herein provides significant advantages when monitoring for and protecting against SQL injection attacks. Since the deployment is placed within the database (e.g., in the execution layer), the current approach can monitor potentially every SQL activity. This means that SQL which does not pass across a network can still be protected, unlike other approaches that place protections within an external and remote firewall across a network. In addition, the current approach can address stored procedures, since such procedure are checked within the database using the current allow-lists. The policies used with the invention allows the allow-list to be adaptively configured, and permits enforcement under a range of different conditions and use cases. The monitoring logs for the current invention are generated efficiently while providing comprehensive context information for each SQL activity.

System Architecture

Figure 6:
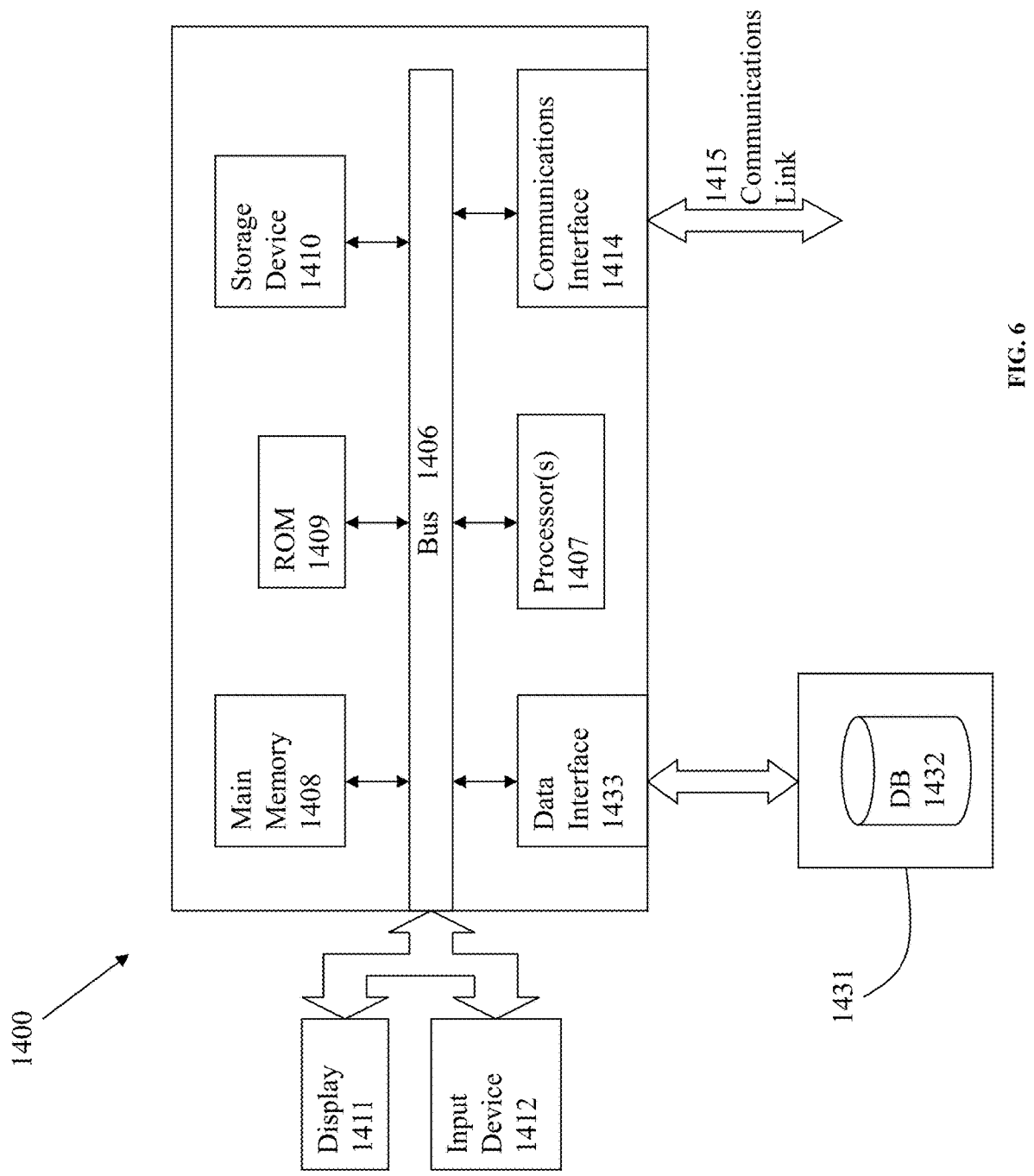
FIG. 6 is a block diagram of an illustrative computing system suitable for implementing an embodiment of the present invention.

FIG. 6 is a block diagram of an illustrative computing system 1400 suitable for implementing an embodiment of the present invention. Computer system 1400 includes a bus 1406 or other communication mechanism for communicating information, which interconnects subsystems and devices, such as processor 1407, system memory 1408 (e.g., RAM), static storage device 1409 (e.g., ROM), disk drive 1410 (e.g., magnetic or optical), communication interface 1414 (e.g., modem or Ethernet card), display 1411 (e.g., CRT or LCD), input device 1412 (e.g., keyboard), and cursor control.

According to some embodiments of the invention, computer system 1400 performs specific operations by processor 1407 executing one or more sequences of one or more instructions contained in system memory 1408. Such instructions may be read into system memory 1408 from another computer readable/usable medium, such as static storage device 1409 or disk drive 1410. In alternative embodiments, hard-wired circuitry may be used in place of or in combination with software instructions to implement the invention. Thus, embodiments of the invention are not limited to any specific combination of hardware circuitry and/or software. In some embodiments, the term "logic" shall mean any combination of software or hardware that is used to implement all or part of the invention.

The term "computer readable medium" or "computer usable medium" as used herein refers to any medium that participates in providing instructions to processor 1407 for execution. Such a medium may take many forms, including but not limited to, non-volatile media and volatile media. Non-volatile media includes, for example, optical or magnetic disks, such as disk drive 1410. Volatile media includes dynamic memory, such as system memory 1408.

Common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 1400. According to other embodiments of the invention, two or more computer systems 1400 coupled by communication link 1410 (e.g., LAN, PTSN, or wireless network) may perform the sequence of instructions required to practice the invention in coordination with one another.

Computer system 1400 may transmit and receive messages, data, and instructions, including program, i.e., application code, through communication link 1415 and communication interface 1414. Received program code may be executed by processor 1407 as it is received, and/or stored in disk drive 1410, or other non-volatile storage for later execution. A database 1432 in a storage medium 1431 may be used to store data accessible by the system 1400.

The techniques described may be implemented using various processing systems, such as clustered computing systems, distributed systems, and cloud computing systems. In some embodiments, some or all of the data processing system described above may be part of a cloud computing system. Cloud computing systems may implement cloud computing services, including cloud communication, cloud storage, and cloud processing.

Figure 7:
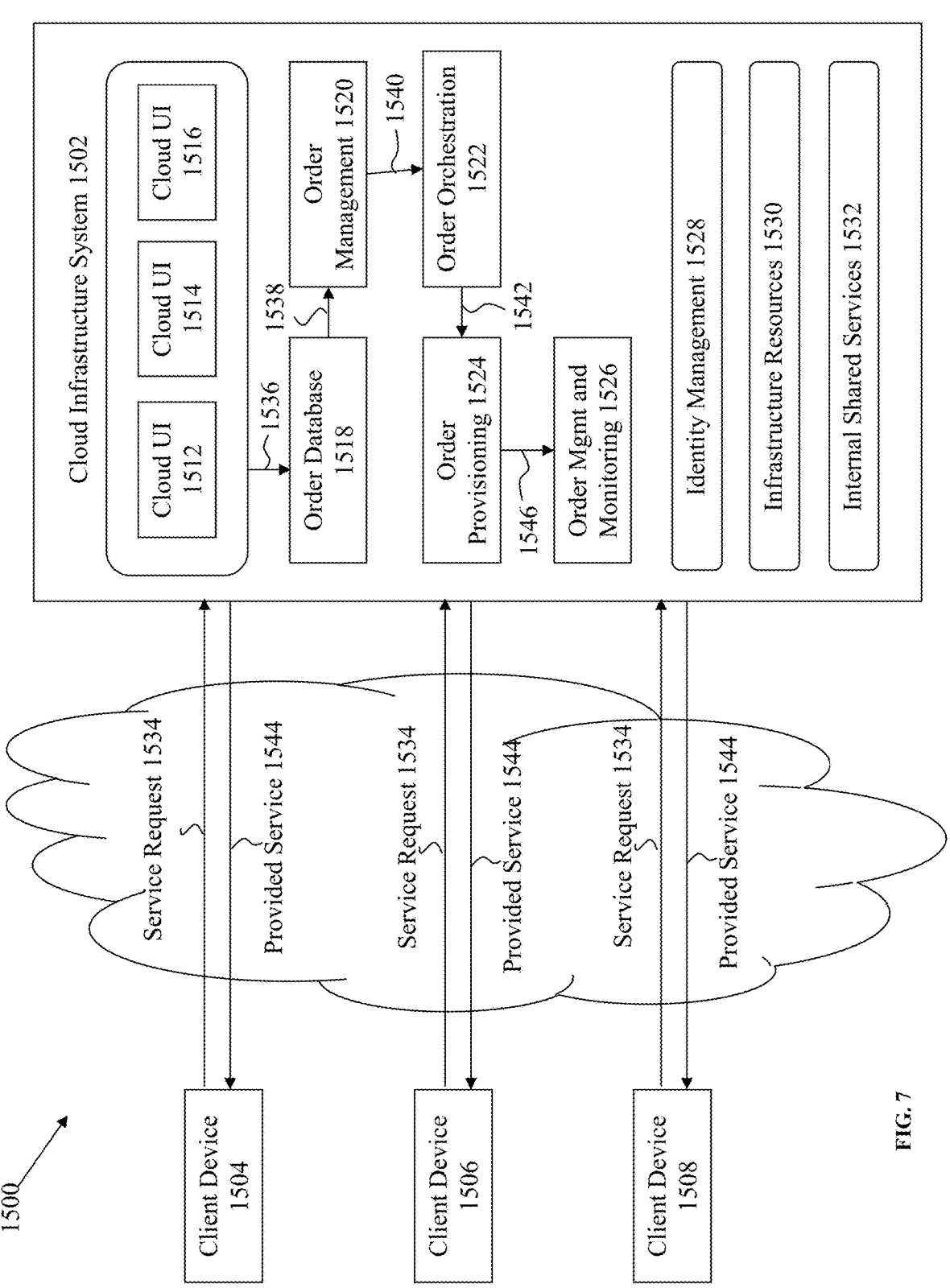
FIG. 7 is a block diagram of one or more components of a system environment in which services may be offered as cloud services, in accordance with an embodiment of the present invention.

FIG. 7 is a simplified block diagram of one or more components of a system environment 1500 by which services provided by one or more components of an embodiment system may be offered as cloud services, in accordance with an embodiment of the present disclosure. In the illustrated embodiment, system environment 1500 includes one or more client computing devices 1504, 1506, and 1508 that may be used by users to interact with a cloud infrastructure system 1502 that provides cloud services. The client computing devices may be configured to operate a client application such as a web browser, a proprietary client application, or some other application, which may be used by a user of the client computing device to interact with cloud infrastructure system 1502 to use services provided by cloud infrastructure system 1502.

It should be appreciated that cloud infrastructure system 1502 depicted in the figure may have other components than those depicted. Further, the embodiment shown in the figure is only one example of a cloud infrastructure system that may incorporate an embodiment of the invention. In some other embodiments, cloud infrastructure system 1502 may have more or fewer components than shown in the figure, may combine two or more components, or may have a different configuration or arrangement of components.

Client computing devices 1504, 1506, and 1508 may be devices similar to those described above for FIG. 6. Although system environment 1500 is shown with three client computing devices, any number of client computing devices may be supported. Other devices such as devices with sensors, etc. may interact with cloud infrastructure system 1502.

Network(s) 1510 may facilitate communications and exchange of data between clients 1504, 1506, and 1508 and cloud infrastructure system 1502. Each network may be any type of network familiar to those skilled in the art that can support data communications using any of a variety of commercially-available protocols. Cloud infrastructure system 1502 may comprise one or more computers and/or servers.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 1502 may include a suite of applications, middleware, and database service offerings that are delivered to a customer in a self-service, subscription-based, elastically scalable, reliable, highly available, and secure manner.

In various embodiments, cloud infrastructure system 1502 may be adapted to automatically provision, manage and track a customer's subscription to services offered by cloud infrastructure system 1502. Cloud infrastructure system 1502 may provide the cloudservices via different deployment models. For example, services may be provided under a public cloud model in which cloud infrastructure system 1502 is owned by an organization selling cloud services and the services are made available to the general public or different industry enterprises. As another example, services may be provided under a private cloud model in which cloud infrastructure system 1502 is operated solely for a single organization and may provide services for one or more entities within the organization. The cloud services may also be provided under a community cloud model in which cloud infrastructure system 1502 and the services provided by cloud infrastructure system 1502 are shared by several organizations in a related community. The cloud services may also be provided under a hybrid cloud model, which is a combination of two or more different models.

In some embodiments, the services provided by cloud infrastructure system 1502 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 1502. Cloud infrastructure system 1502 then performs processing to provide the services in the customer's subscription order.

In some embodiments, the services provided by cloud infrastructure system 1502 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by the cloud infrastructure system via a PaaS platform. The PaaS platform may be configured to provide cloud services that fall under the PaaS category. Examples of platform services may include without limitation services that enable organizations to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services, and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloudservices may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 1502 may also include infrastructure resources 1530 for providing the resources used to provide various services to customers of the cloud infrastructure system. In one embodiment, infrastructure resources 1530 may include pre-integrated and optimized combinations of hardware, such as servers, storage, and networking resources to execute the services provided by the PaaS platform and the SaaS platform.

In some embodiments, resources in cloud infrastructure system 1502 may be shared by multiple users and dynamically re-allocated per demand. Additionally, resources may be allocated to users in different time zones. For example, cloud infrastructure system 1502 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 1532 may be provided that are shared by different components or modules of cloud infrastructure system 1502 and by the services provided by cloud infrastructure system 1502. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 1502 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 1502, and the like.

In one embodiment, as depicted in the figure, cloud management functionality may be provided by one or more modules, such as an order management module 1520, an order orchestration module 1522, an order provisioning module 1524, an order management and monitoring module 1526, and an identity management module 1528. These modules may include or be provided using one or more computers and/or servers, which may be general purpose computers, specialized server computers, server farms, server clusters, or any other appropriate arrangement and/or combination.

In operation 1534, a customer using a client device, such as client device 1504, 1506 or 1508, may interact with cloud infrastructure system 1502 by requesting one or more services provided by cloud infrastructure system 1502 and placing an order for a subscription for one or more services offered by cloud infrastructure system 1502. In certain embodiments, the customer may access a cloud User Interface (UI), cloud UI 1512, cloud UI 1514 and/or cloud UI 1516 and place a subscription order via these UIs. The order information received by cloud infrastructure system 1502 in response to the customer placing an order may include information identifying the customer and one or more services offered by the cloud infrastructure system 1502 that the customer intends to subscribe to.

After an order has been placed by the customer, the order information is received via the cloud UIs, 1512, 1514 and/or 1516. At operation 1536, the order is stored in order database 1518. Order database 1518 can be one of several databases operated by cloud infrastructure system 1518 and operated in conjunction with other system elements. At operation 1538, the order information is forwarded to an order management module 1520. In some instances, order management module 1520 may be configured to perform billing and accounting functions related to the order, such as verifying the order, and upon verification, booking the order. At operation 1540, information regarding the order is communicated to an order orchestration module 1522. Order orchestration module 1522 may utilize the order information to orchestrate the provisioning of services and resources for the order placed by the customer. In some instances, order orchestration module 1522 may orchestrate the provisioning of resources to support the subscribed services using the services of order provisioning module 1524.

In certain embodiments, order orchestration module 1522 enables the management of business processes associated with each order and applies business logic to determine whether an order should proceed to provisioning. At operation 1542, upon receiving an order for a new subscription, order orchestration module 1522 sends a request to order provisioning module 1524 to allocate resources and configure those resources needed to fulfill the subscription order. Order provisioning module 1524 enables the allocation of resources for the services ordered by the customer. Order provisioning module 1524 provides a level of abstraction between the cloud services provided by cloud infrastructure system 1502 and the physical implementation layer that is used to provision the resources for providing the requested services. Order orchestration module 1522 may thus be isolated from implementation details, such as whether or not services and resources are actually provisioned on the fly or pre-provisioned and only allocated/assigned upon request.

At operation 1544, once the services and resources are provisioned, a notification of the provided service may be sent to customers on client devices 1504, 1506 and/or 1508 by order provisioning module 1524 of cloud infrastructure system 1502.

At operation 1546, the customer's subscription order may be managed and tracked by an order management and monitoring module 1526. In some instances, order management and monitoring module 1526 may be configured to collect usage statistics for the services in the subscription order, such as the amount of storage used, the amount data transferred, the number of users, and the amount of system up time and system down time.

In certain embodiments, cloud infrastructure system 1502 may include an identity management module 1528. Identity management module 1528 may be configured to provide identity services, such as access management and authorization services in cloud infrastructure system 1502. In some embodiments, identity management module 1528 may control information about customers who wish to utilize the services provided by cloud infrastructure system 1502. Such information can include information that authenticates the identities of such customers and information that describes which actions those customers are authorized to perform relative to various system resources (e.g., files, directories, applications, communication ports, memory segments, etc.) Identity management module 1528 may also include the management of descriptive information about each customer and about how and by whom that descriptive information can be accessed and modified.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

What is claimed is:

1. A method, comprising:
   capturing information of a Structured Query Language (SQL) statement that has previously executed within a database into a database log, the database log comprising a plurality of logs, each log of the plurality of logs including a plurality of fields populated with respective captured SQL statement information;
   analyzing the previously executed SQL statement information captured into the database log to determine whether the previously executed SQL statement should be permitted for subsequent execution within the database;
   generating or updating a SQL allow-list to include the previously executed SQL statement after determining that the previously executed SQL statement should be permitted for subsequent execution within the database; and
   after generating or updating the SQL allow-list, receiving a SQL statement at the database for processing and enforcing the SQL allow-list within the database, wherein the received SQL statement is permitted to execute in the database when the received SQL statement matches the previously executed SQL statement in the allow-list.

2. The method of claim 1, wherein the previously executed SQL statement is represented as a signature value in the SQL allow-list.

3. The method of claim 2, wherein the previously executed SQL statement is converted into the signature value by performing SQL normalization on the previously executed SQL statement, identifying accessed objects, and hashing against a combination of the normalized previously executed SQL statement and the accessed objects.

4. The method of claim 1, wherein the plurality of logs of the database log comprises:
   a SQL signature log, wherein a SQL signature entry in the SQL signature log is generated to uniquely identify each distinct captured SQL statement,
   a session log, wherein an entry in the session log is generated for each new database connection, and
   an event log, wherein an entry in the event log is generated for each previously executed SQL command.

5. The method of claim 4, wherein
   the SQL signature log comprises entries or fields for a SQL signature, a SQL text, an accessed object and a command type,
   the event log comprises entries or fields for a session identifier, the SQL signature, a current user identifier (ID), a top level (Y/N) indicator, and a session user ID, and
   the SQL log comprises entries or fields for the session ID, the session user ID, an Internet Protocol (IP) address, a client program, an operation system (OS) username and a timestamp.

6. The method of claim 1, further comprising generating or updating a context allow-list comprising one or more session attributes, and enforcing the context allow-list to determine if a condition of the one or more session attributes is met for a session to execute the received SQL statement.

7. The method of claim 1, wherein a SQL enforcement module inside of a kernel of the database performs enforcement of the SQL allow-list within the database.

8. The method of claim 1, further comprising generating or updating a SQL deny-list, and enforcing the SQL deny-list within the database, wherein execution of the received SQL statement is permitted to execute when the received SQL does not match an entry in the SQL deny-list.

9. The method of claim 1, wherein
a first log and a second log of the plurality of logs both include first information, and
the second log and a third log of the plurality of logs both include second information different from the first information.

10. The method of claim 9, wherein the first log is a SQL log, the second log is an event log, and the third log is a session log.

11. The method of claim 10, wherein
the SQL log and the event log include first information comprising a SQL signature, and
the event log and the session log include second information comprising a session identifier (ID).

12. The method of claim 11, the second log and a third log of the plurality of logs both include third information different from the first information and the second information, the third information comprising a session user ID.

13. The method of claim 10, wherein
the SQL log comprises entries or fields for a SQL signature, a SQL text, an accessed object and a command type,
the event log comprises entries or fields for a session identifier, the SQL signature, a current user ID, a top level (Y/N) indicator, and a session user ID, and
the session log comprises entries or fields for the session ID, the session user ID, an Internet Protocol (IP) address, a client program, an operation system (OS) username and a timestamp.

14. The method of claim 1, wherein each log of the plurality of logs of the database log is structured as a relational database table comprising a plurality of columns and a plurality of rows.

15. A system, comprising:
a processor;
a memory for holding programmable code; and
wherein the programmable code includes instructions executable by the processor for capturing information of a Structured Query Language (SQL) statement that has previously executed within a database into a database log, the database log comprising a plurality of logs, each log of the plurality of logs including a plurality of fields populated with respective captured SQL statement information;
analyzing the previously executed SQL statement information captured into the database log to determine whether the previously executed SQL statement should be permitted for subsequent execution within the database;
generating or updating a SQL allow-list to include the previously executed SQL statement after determining that the previously executed SQL statement should be permitted for subsequent execution within the database; and
after generating or updating the SQL allow-list, receiving a SQL statement at the database for processing and enforcing the SQL allow-list within the database, wherein the received SQL statement is permitted to execute in the database when the received SQL statement matches the previously executed SQL statement in the allow-list.

16. The system of claim 15, wherein the previously executed SQL statement is represented as a signature value in the SQL allow-list.

17. The system of claim 16, wherein the previously executed SQL statement is converted into the signature value by performing SQL normalization on the previously executed SQL statement, identifying accessed objects, and hashing against a combination of the normalized previously executed SQL statement and the accessed objects.

18. The system of claim 15, wherein the plurality of logs of the database log comprises:
a SQL signature log, wherein a SQL signature entry in the SQL signature log is generated to uniquely identify each distinct captured SQL statement,
a session log, wherein an entry in the session log is generated for each new database connection, and
an event log, wherein an entry in the event log is generated for each executed SQL command.

19. The system of claim 15, further comprising generating or updating a context allow-list comprising one or more session attributes, and enforcing the context allow-list to determine if a condition of the one or more session attributes is met for a session to be run to execute the received SQL statement.

20. The system of claim 15, wherein a SQL enforcement module inside of a kernel of the database performs enforcement of the SQL allow-list within the database.

21. The system of claim 15, further comprising generating or updating a SQL deny-list, and enforcing the SQL deny-list within the database, wherein execution of the received SQL statement is permitted to execute when the received SQL does not match an entry in the SQL deny-list.

22. A computer program product embodied on a computer readable medium, the computer readable medium having stored thereon a sequence of instructions which, when executed by a processor, executes at least:
capturing information of a Structured Query Language (SQL) statement that has previously executed within a database into a database log, the database log comprising a plurality of logs, each log of the plurality of logs including a plurality of fields populated with respective captured SQL statement information;
analyzing the previously executed SQL statement information captured into the database log to determine whether the previously executed SQL statement should be permitted for subsequent execution within the database;
generating or updating a SQL allow-list to include the previously executed SQL statement after determining that the previously executed SQL statement should be permitted for subsequent execution within the database; and
after generating or updating the SQL allow-list, receiving a SQL statement at the database for processing and enforcing the SQL allow-list within the database, wherein the received SQL statement is permitted to execute in the database when the received SQL statement matches the previously executed SQL statement in the allow-list.

23. The computer program product of claim 22, wherein the previously executed SQL statement is represented as a signature value in the SQL allow-list.

24. The computer program product of claim 23, wherein the previously executed SQL statement is converted into the signature value by performing SQL normalization on the previously executed SQL statement, identifying accessed objects, and hashing against a combination of the normalized previously executed SQL statement and the accessed objects.

25. The computer program product of claim 22, wherein wherein the plurality of logs of the database log comprises:

a SQL signature log, wherein a SQL signature entry in the SQL signature log is generated to uniquely identify each distinct captured SQL statement, a session log, wherein an entry in the session log is generated for each new database connection, and an event log, wherein an entry in the event log is generated for each executed SQL command.

26. The computer program product of claim 22, further comprising generating or updating a context allow-list comprising one or more session attributes, and enforcing the context allow-list to determine if a condition of the one or more session attributes is met for a session to be run to execute the received SQL statement.

27. The computer program product of claim 22, wherein a SQL enforcement module inside of a kernel of the database performs enforcement of the SQL allow-list within the database.

28. The computer program product of claim 22, further comprising generating or updating a SQL deny-list, and enforcing the SQL deny-list within the database, wherein execution of the received SQL statement is permitted to execute when the received SQL does not match an entry in the SQL deny-list.

* * * * *